No. 766,654. PATENTED AUG. 2, 1904.
R. BAGGALEY & C. M. ALLEN.
METHOD OF RECOVERING VALUES FROM ORES BY DISSOLVING IN MOLTEN BATHS.
APPLICATION FILED MAR. 17, 1904.
NO MODEL. 4 SHEETS—SHEET 1.

WITNESSES
INVENTORS
Ralph Baggaley
C. M. Allen

No. 766,654. PATENTED AUG. 2, 1904.
R. BAGGALEY & C. M. ALLEN.
METHOD OF RECOVERING VALUES FROM ORES BY DISSOLVING IN MOLTEN BATHS.
APPLICATION FILED MAR. 17, 1904.
NO MODEL. 4 SHEETS—SHEET 2.

WITNESSES
INVENTORS

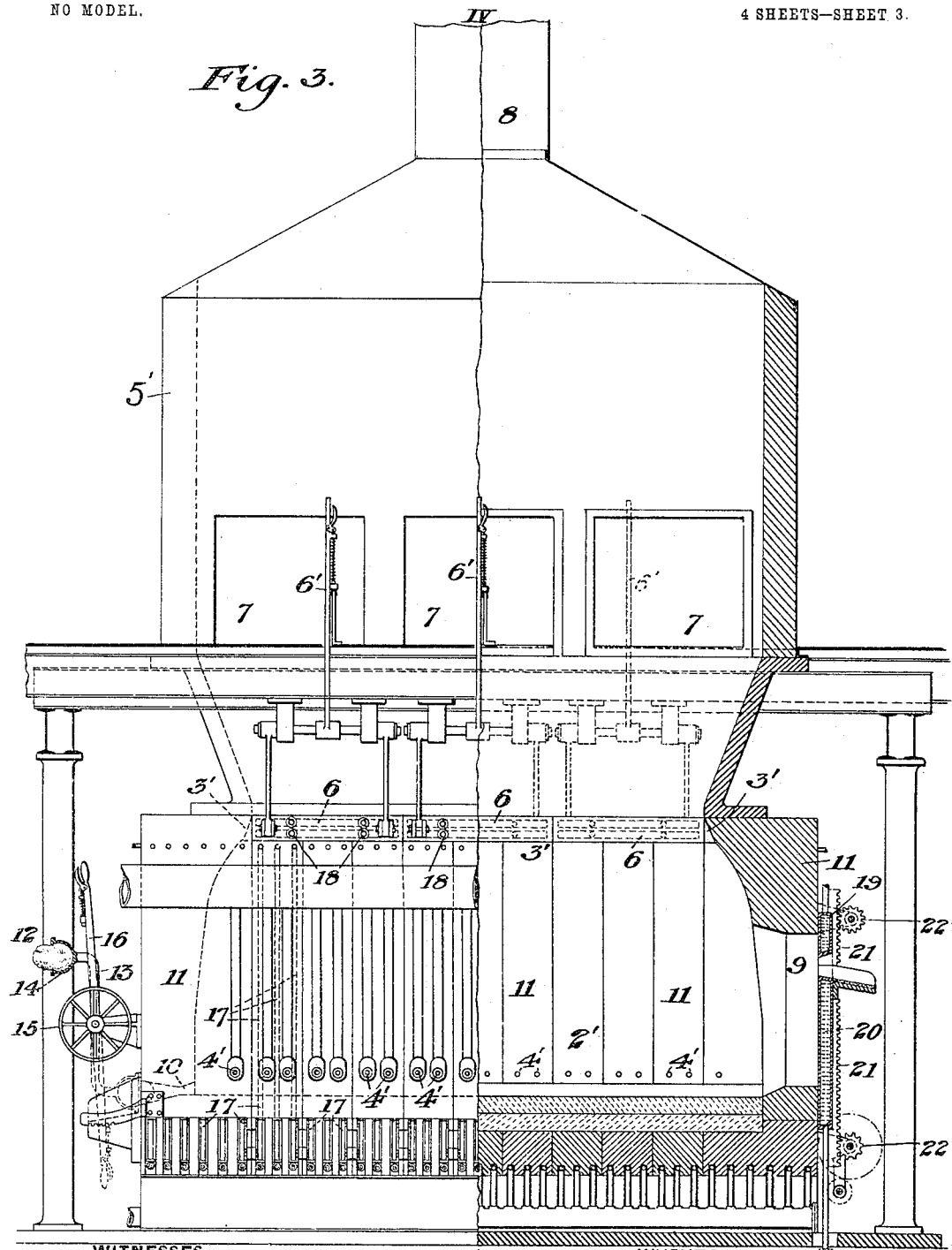

No. 766,654. PATENTED AUG. 2, 1904.
R. BAGGALEY & C. M. ALLEN.
METHOD OF RECOVERING VALUES FROM ORES BY DISSOLVING IN MOLTEN BATHS.
APPLICATION FILED MAR. 17, 1904.
NO MODEL. 4 SHEETS—SHEET 4.
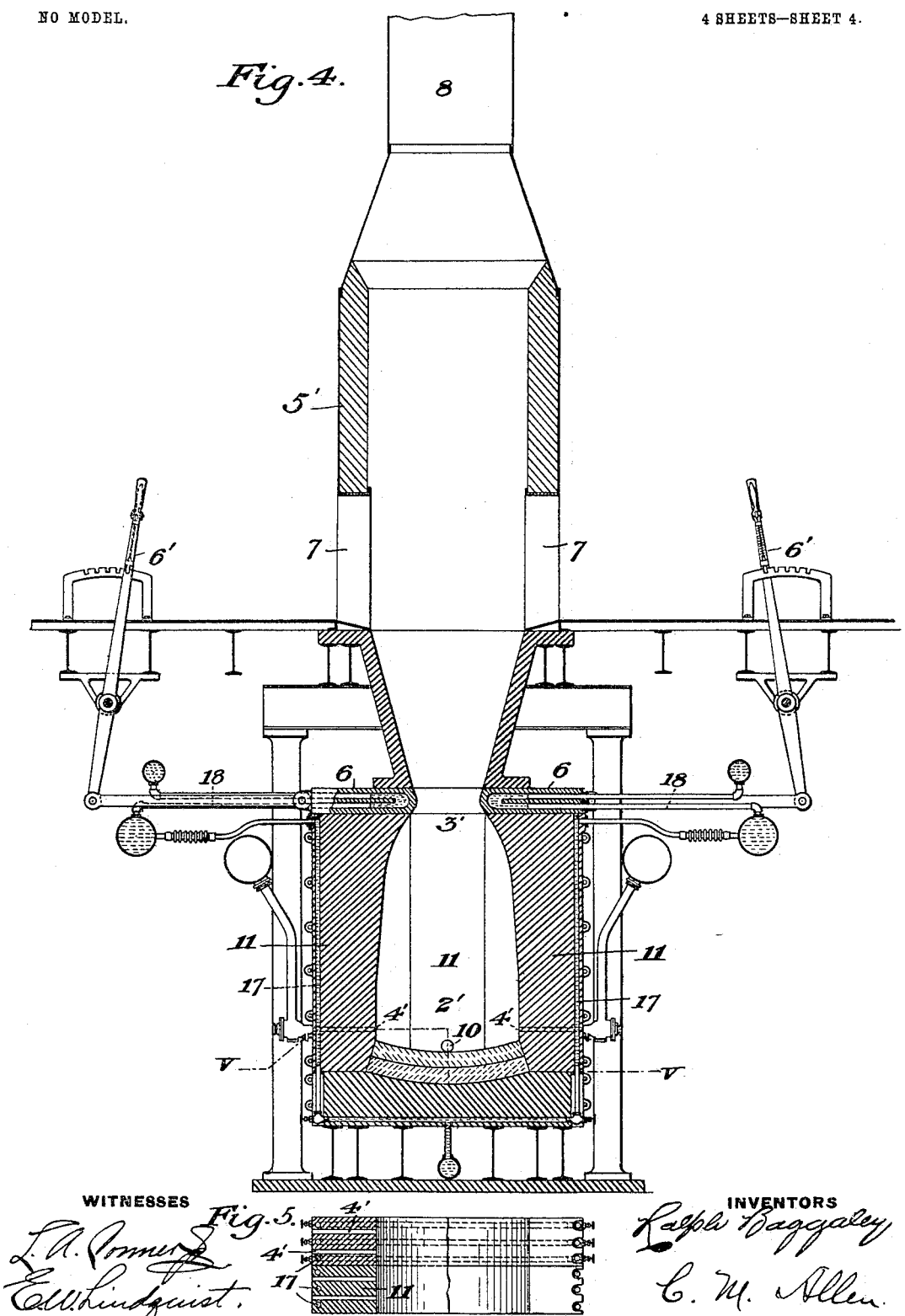
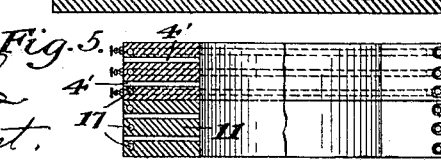
WITNESSES
INVENTORS No. 766,654. Patented August 2, 1904.

UNITED STATES PATENT OFFICE.

RALPH BAGGALEY, OF PITTSBURG, PENNSYLVANIA, AND CHARLES M. ALLEN, OF LOLO, MONTANA; SAID ALLEN ASSIGNOR TO SAID BAGGALEY.

METHOD OF RECOVERING VALUES FROM ORES BY DISSOLVING IN MOLTEN BATHS.

SPECIFICATION forming part of Letters Patent No. 766,654, dated August 2, 1904.

Application filed March 17, 1904. Serial No. 198,593. (No specimens.)

*To all whom it may concern:*

Be it known that we, RALPH BAGGALEY, of Pittsburg, in the county of Allegheny and State of Pennsylvania, and CHARLES M. ALLEN, of Lolo, in the county of Missoula and State of Montana, have invented a new and useful Method of Recovering Values from Ores by Dissolving in a Molten Bath, of which the following is a description, reference being had to the accompanying drawings, in which—

Figure 1:
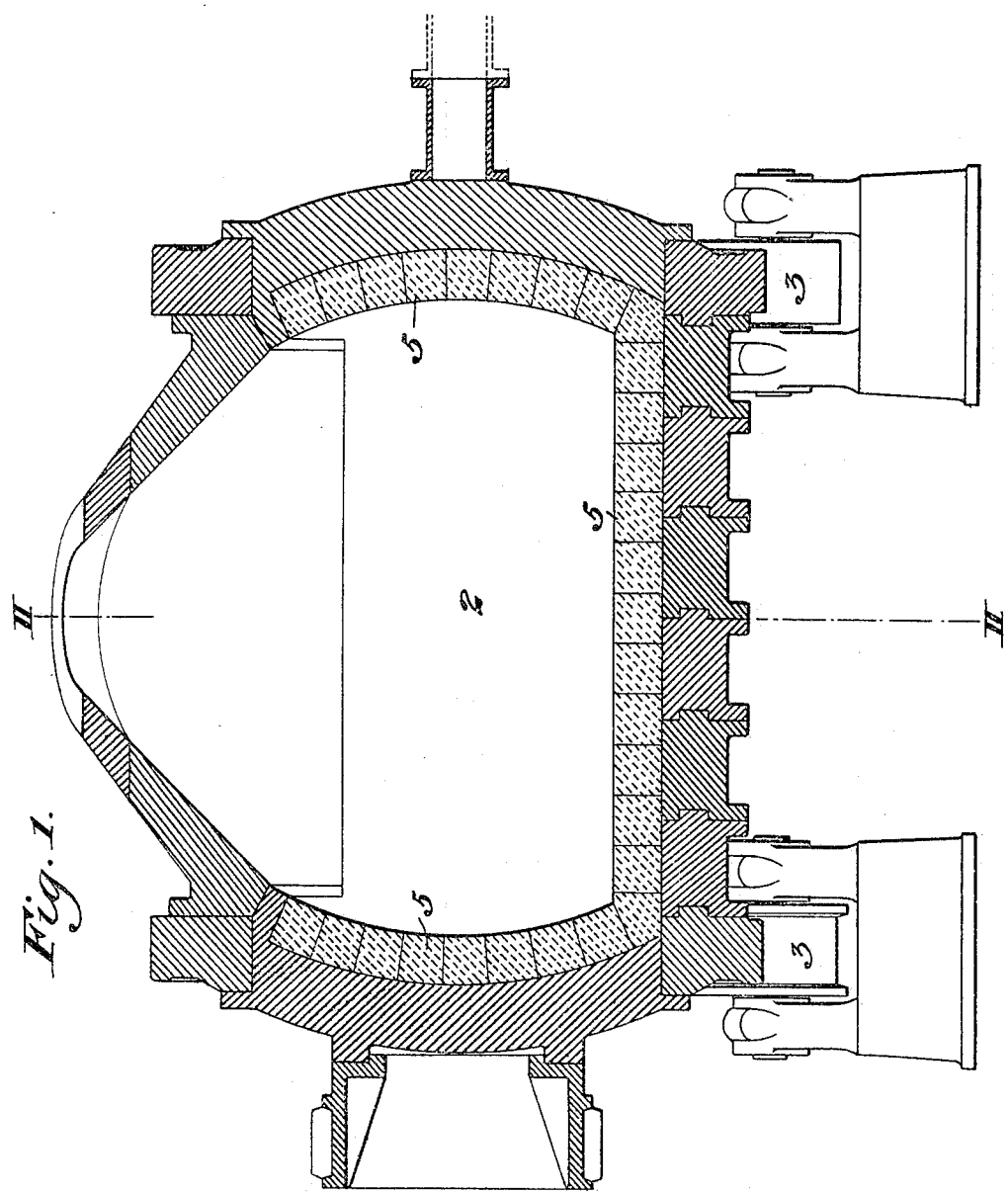
Figure 2:
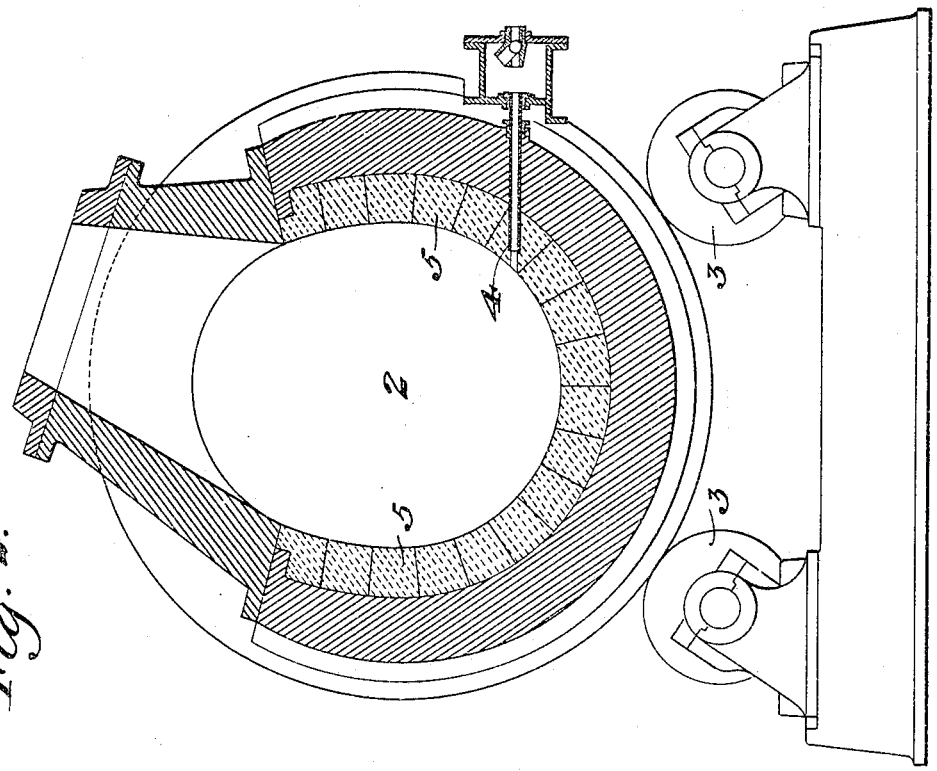

Figure 1 shows in vertical axial section a converter suitable for the practice of our invention. Fig. 2 is a vertical cross-section on the line II II of Fig. 1. Fig. 3 is an elevation, partly in longitudinal section, of a modified form of apparatus, which is a fixed converter or converting-furnace. Fig. 4 is a vertical section on the line IV IV of Fig. 3. Fig. 5 is a longitudinal section on the line V V of Fig. 4.

Our invention provides means for producing copper or matte without the need of water concentration and calcining and without the use of carbonaceous fuel or with only a small percentage of such fuel. The many attempts which have been made heretofore to accomplish this result have been unsuccessful. It has not been understood how to control the operation and retain the heat and to prevent the furnace from choking up with accretions of slag, matte, iron, ore, and coke, and other difficulties have been encountered which our invention obviates. The desirability of such process, although never heretofore realized in practice, is well understood. It avoids the need of water concentration, with the great expense and the loss of mineral values incident thereto. It also avoids the calcination of the ore previous to smelting, which is an expensive and wasteful process. It effects a great saving in fuel and prevents the losses due to the abundant escape of flue-dust, which has been inseparable from prior processes. In short, the prior practice produces a fifty-per-cent. copper matte by water concentration, calcining, and slow smelting with from ten to twenty per cent. of coke, while in our process the ore tonnage without previous water concentration can be quickly smelted, nine-tenths of it discharged as worthless slag, and the remainder converted into matte.

The present practice of smelting copper ores as practiced in the Butte district is briefly as follows: The ores before being taken to the smelter are enriched by water concentration, and, owing to the scarcity of water at the mines, they are generally transported long distances by rail to places where the water-supply is sufficient for a concentration plant. Thus in one instance the ore is transported for thirty miles, in another fifty-four miles, and in another one hundred and seventy-two miles, thus causing a great expense for the hauling of the ore to the concentrating plant and sometimes in returning the concentrates to the smelter.

It is not practicable to concentrate talcky ores, because they choke the water-concentrating machinery, and the sticky talc carries away with it from the concentrator the entire mineral values. Hence such talcky ores must be discarded and left in the mine-workings. Low-grade ores and ores high in iron have been similarly left in the mines, because they could not be profitably treated. These ores can well be used in our process.

Nine-tenths of the total ore production of Butte is concentrated, with a resultant loss in mineral values of at least twenty per cent., and this, added to the cost of the necessary plant and the cost of treatment and transportation, increases the charges very largely.

After the ores have been concentrated they must be roasted in calcining-furnaces, involving an additional expense for handling and a loss of values in flue-dust and volatilization. The calcining consumes a large part of the sulfur content of the ore, while in our process the sulfur is employed usefully as a fuel for generating the necessary heat. The concentrates of the present practice must be briqueted after calcining if they are to be smelted in a blast-furnace. Otherwise they must be smelted in a reverberatory or Swansea furnace, and either operation is expensive. Where a blast-furnace is employed it has been operated with a high percentage of coke in producing a matte sufficiently rich in copper to admit of its subsequent conversion into blister-copper in the converter, and in addition to its cost coke is objectionable because it displaces about six times its weight of ore, and thus reduces the capacity of the furnace.

Our invention does away with the necessity of water concentration, calcining, and briqueting, it produces copper matte and copper from ores with little loss and with little or no carbonaceous fuel, and makes possible the use of ores which heretofore have not been smelted successfully. We substitute concentration by fusion for the water concentration heretofore employed, we overcome to a large extent the expense and loss of values incident to former practice, and we effect a great saving of cost.
In practicing our invention in the best and preferred manner we separate the so-called "sulfid" ores from the more highly silicious ores and use them both in the manner described below. The sulfid ores include ores which are relatively low in silica and high in matte-making sulfids, such as pyrite, pyrrhotite, and the various sulfids and arsenides of copper. The talcky ores above mentioned come within this class. The highly-silicious ores referred to are relatively high in silica and low in matte-making materials. The so-called "highly-silicious" ores of Butte, which heretofore have been concentrated with water for removal of silica, are examples of this class.

The low silica or sulfid ores above mentioned are smelted in our process in a furnace of any suitable type and with or without the use of carbonaceous fuel to produce a low-grade matte high in fuel value—that is, high in its content of sulfur, iron, and other oxidizable elements. The matte and slag are discharged from the smelting-furnace into the usual forehearth, where the slag is separated from the matte, and the matte is then drawn off from time to time as required for use in the converter, where the next step of our process is practiced.

The converter 2 is shown in Figs. 1 and 2 and is mounted on a cradle 3, of rollers, or is otherwise arranged so that it can be tipped. It has twyers 4 and a lining 5, of magnesite or other basic material, or it may be unlined and present bare metal walls, the purpose being that the interior shall be non-silicious, except where silicious ore is added at the lining, as hereinafter described, and therefore that the iron of the bath shall flux with the silica of the added ore and not with the silica of a lining.

After having prepared a matte as above described it is charged into the converter in a molten condition and free from slag. The matte constitutes a bath in which heat is generated by oxidation and which liquefies and dissolves the additions of ore made to it from time to time. After the bath matte has been provided in the converter relatively small charges of the silicious ore above mentioned are added to it from time to time. The blast of air introduced in great abundance through the twyers oxidizes the combustible ingredients of the bath—namely, sulfur and iron and other oxidizable elements—and produces within the bath an intense heat, the oxidized iron combines with the silica of the added ore and forms a floating slag, while the metallic compounds of the added ore are dissolved in the molten bath. Thus the body of matte is continually enriched by oxidation, its iron is fluxed by the silica of the added ore, and the sulfids of the ore pass into the bath, the heat required for dissolving the sulfids and fluxing the silica and iron being supplied in the bath by oxidation. The slag should be drawn off from time to time, the converter being tipped for this purpose, and the surface of the bath is thus kept as clean as possible, so that the ready dissolving of the added ore shall not be impeded. As the matte becomes enriched—i. e., loses its iron and sulfur, &c., by combination with the silica of the ore and the oxygen of the air-blast—the volume of the bath largely decreases. For example, if the original bath contained eight per cent. of copper, an enrichment of it to sixteen per cent. would reduce its volume about one-half. Hence when the volume has thus been reduced to a certain extent—say one-half—or to any suitable extent short of uncovering the twyers the operator should replenish the converter with a fresh addition of the molten matte smelted, as above stated, from low-silica ores and should then carry on the operation as before, making additions of molten matte as the converter needs replenishing and from time to time adding silicious ore and withdrawing the slag. This is continued until finally the converter has received its full charge of matte, which is enriched to the extent desired and is then poured either as converter-matte or as blister-copper. The operation is then begun again by supplying the converter with a new molten bath taken from the forehearth of the smelting-furnace, as above described.

Within the scope of our invention, as broadly claimed, the low-silica ores high in fuel value may be added to the bath in whole or in part in a solid condition instead of first smelting and adding them as a molten matte; but it is much better to add the molten matte, as above described, and this practice is made the subject of special claim.

The amounts of silicious ore to be added and the time of the additions are easily determined by the converter foreman, the purpose being to add it as the charge needs a flux for the contained iron and the effect of its addition being to flux the iron and to give up its matte-producing ingredients to the bath. The quantity of unfused ore in the converter at any time must be less than the quantity of fused bath then in the furnace. The process, however, uses in the aggregate large quantities of silicious ore, the values of which we thus obtain without previous water concentration or calcining.

Instead of adding the silicious ore by placing it on top of the bath, as above described, we may add it in whole or in part by from time to time withdrawing the bath or a part of it from the converter, then applying the ore to the bottom, which, being coated with viscous slag or matte, will retain a considerable body of the ore, and thereafter replacing the bath and continuing the operation.

Instead of the tipping converter above described we may employ a stationary converter, such as shown in Figs. 3 and 4. The tipping converter is more convenient, because it facilitates the removal of the slag and matte or metal; but the stationary converter may be used with advantage when it is desired to practice the process as a continuous process by tapping off from time to time parts only of the matte, leaving a residue in the converter for further carrying on of the process. The stationary converter has either no lining or a basic lining, and its interior is therefore non-silicious, except as stated below. It has a lower converting portion 2' and twyers 4' 4', which enter the same near the bottom, preferably as near the bottom as is practicable, so that the twyers will always be below the level of the bath of liquid matte. The upper portion of the chamber 2' is contracted, as at 3', so as to form a comparatively narrow neck or passage connecting it with the upper charging portion 5'. The walls of the chamber 2' preferably slope inwardly, and the chamber is much wider at the bottom portion than at the throat. In this way we are enabled to retain the heat in the chamber and to concentrate the splashing of the liquid matte or slag by the blast at a distance from the side walls, so that the matte and slag when so splashed will drop back without settling on and encrusting the walls. The throat 3' may be rendered variable in width by providing one or more sliding sections 6, which may be moved inwardly by levers 6' through a space in the furnace-wall. The appropriate adjustment of these sections will contribute to maintaining the heat of the furnace at the proper degree.

7 7 are the charging-doors, and 8 is the usual stack. 9 is the slag-tap, and 10 the metal tap.

The walls of the chamber 2' should be made of material which will withstand the very high temperature generated during the process without abstracting heat so rapidly as to cause chilling and clogging of the furnace. For this purpose we prefer to make the walls of thick metal blocks 11, of copper or cast-iron, and we may provide them with small cooling-channels through which water may be passed in order to prevent overheating, the amount of water and time of passing it being governed by the working of the converter as observed by the operator. In lieu of water air either forced by machinery or supplied by simple draft may be used as a means of regulating the travel of heat through the walls. The heavy metal blocks are intended to retain the heat in the furnace, while the water and air-currents are intended to cool the outside of the blocks.

12 is a botting device for the tap-hole 10. It has an arm 13, provided with a cup 14, adapted to hold a plug of clay or like material which may be swung by a hand-wheel 15 to bring the plug against the tap-hole, where it is held by a locking-lever 16. We also show in the drawings separately valve-controlled water-cooling passages 17 in the furnace-walls connecting with water-pipes 18, which are also connected with water-passages in the sliding sections 6. The slag-tap is preferably made adjustable to any degree of opening by two vertically-sliding sections 19 20, which are actuated by racks 21 and pinions 22. By separating them a wide opening is afforded for insertion of a rabble when skimming is necessary.

The invention may be practiced with the stationary converter, substantially as described above. The chamber 2' is charged with matte from the smelting-furnace up to the level of the slag-tap or thereabout, air is blown thereinto through the twyers, silicious ore is added, the slag tapped off from time to time, and the bath replenished with fresh additions of molten matte as its volume decreases by reason of its enrichment or as it requires an accession of fuel-bearing constituents to maintain its temperature. When the slag is tapped, the twyers must be plugged and the blast thus turned off. The addition of silicious ore, as in the tipping converter, should be made when the bath is relatively bare of slag.

By the term "low-grade matte," used in the claims, we mean matte containing a less percentage of metal values and a higher percentage of fuel constituents—iron, sulfur, and the like—than is employed in present converter practice. Thus in a modern text-book it is stated that at the present time in America no copper material is regularly bessemerized, excepting matte containing over forty-five per cent. copper, and that a matte of from forty-five to fifty per cent. is considered low grade when referring to the Bessemer process as usually carried out in America. As compared with this practice we believe that we are the first to provide a body of matte of lower grade than can be used in present converter practice without too rapid corrosion of the lining, and employ it as a bath to which are made successive additions of value-bearing ore relatively high in silica for the purpose of enriching the bath with the contained values and fluxing the iron of the matte. The matte which we prefer to use for this purpose contains from six to twelve per cent. of metal values, since such matte can be produced readily and with economy by melting sulfid ores; but it may contain a considerably higher percentage of such values.

The invention may be modified in many ways and may be carried out in apparatus of widely-different construction, since

What we claim is—

1. The method herein described of producing matte or copper, which consists in forming a molten bath of matte, blowing air thereinto, adding ore relatively high in silica, fluxing thereby the iron of the bath, and replenishing the bath with material relatively low in silica and high in matte-making compounds; substantially as described.

2. The method herein described of producing matte or copper, which consists in forming a molten bath of low-grade matte, blowing air thereinto, adding ore relatively high in silica, fluxing thereby the iron of the bath, and replenishing the bath with material relatively low in silica and high in matte-making compounds; substantially as described.

3. The method herein described which consists in producing a low-grade molten matte, transferring it to a converter having a non-silicious interior, blowing air thereinto and adding silicious metal-bearing ore, and replenishing the bath with molten matte as the volume of the bath is decreased by enrichment; substantially as described.

4. The method herein described which consists in forming a low-grade molten matte from ores relatively low in silica and high in matte-making values, separating the slag therefrom, placing the matte in a converter and blowing air thereinto, adding silicious ore and replenishing the bath with fresh additions of such matte; substantially as described.

5. The method herein described which consists in forming a bath of molten matte, blowing air thereinto while in a converter and adding to the molten bath different charges, one of which contains a relatively large fuel-supply in the form of oxidizable elements and the other of which contains a relatively high content of silica; substantially as described.

6. The method herein described of producing copper, which consists in forming a molten bath of low-grade matte, blowing air thereinto, making successive additions of value-bearing ore relatively high in silica, and fluxing thereby the iron of the matte; substantially as described.

7. The method herein described, which consists in producing a low-grade molten matte, transferring it to a converter, blowing air thereinto, and fluxing the iron thereof with additions of silicious material, and replenishing the bath with molten matte as the volume of the bath is decreased by enrichment; substantially as described.

8. The method herein described of producing copper, which consists in forming a molten bath of low-grade matte, blowing air thereinto, and fluxing the iron thereof by combination with value-bearing ore relatively high in silica; substantially as described.

In testimony whereof we have hereunto set our hands March 12, 1904.

RALPH BAGGALEY.
C. M. ALLEN.

Witnesses:
THOMAS W. BAKEWELL,
LENDELL A. CONNER, Jr.